US012198533B2

(12) United States Patent
Ding et al.

(10) Patent No.: US 12,198,533 B2
(45) Date of Patent: Jan. 14, 2025

(54) DOORBELL SYSTEM

(71) Applicant: HANGZHOU MEARI TECHNOLOGY CO., LTD, Zhejiang (CN)

(72) Inventors: Hugang Ding, Zhejiang (CN); Wei Jin, Zhejiang (CN); Hongli Ying, Zhejiang (CN)

(73) Assignee: HANGZHOU MEARI TECHNOLOGY CO., LTD, Zhejiang (CN)

( * ) Notice: Subject to any disclaimer, the term of this patent is extended or adjusted under 35 U.S.C. 154(b) by 95 days.

(21) Appl. No.: 18/024,769

(22) PCT Filed: Mar. 16, 2021

(86) PCT No.: PCT/CN2021/080909
§ 371 (c)(1),
(2) Date: Mar. 5, 2023

(87) PCT Pub. No.: WO2022/083050
PCT Pub. Date: Apr. 28, 2022

(65) Prior Publication Data
US 2023/0316879 A1 Oct. 5, 2023

(30) Foreign Application Priority Data
Oct. 20, 2020 (CN) ......................... 202011124527.7

(51) Int. Cl.
*G08B 3/10* (2006.01)
*G08B 1/08* (2006.01)

(52) U.S. Cl.
CPC *G08B 3/10* (2013.01); *G08B 1/08* (2013.01)

(58) Field of Classification Search
CPC .................................... G08B 3/10; G08B 1/08
(Continued)

(56) References Cited

U.S. PATENT DOCUMENTS 5,894,262 A * 4/1999 McCavit .................. G08B 3/10 340/553
7,023,327 B1 * 4/2006 Chen ........................ G08B 3/10 340/392.5
(Continued)

FOREIGN PATENT DOCUMENTS

CN 203894878 U 10/2014
CN 106251429 A 12/2016
(Continued)

OTHER PUBLICATIONS

International Search Report for PCT/CN2021/080909 mailed Jul. 29, 2021, ISA/CN.

*Primary Examiner* — Kerri L McNally
*Assistant Examiner* — Thang D Tran
(74) *Attorney, Agent, or Firm* — Yue (Robert) Xu; Apex Attorneys at Law, LLP

(57) ABSTRACT

Provided is a doorbell system, including an indoor terminal, an outdoor terminal, and a power supply (100). The indoor terminal includes a bell controller (220) and an indoor bell (210) which are connected in parallel; the outdoor terminal includes an outdoor doorbell (310) and an outdoor switch (320); the indoor terminal, the outdoor terminal, and the power supply (100) are connected in series to form a closed loop; in response to the outdoor switch (320) being switched off, the bell controller (220) is turned on, the indoor bell (210) is short-circuited, and the power supply (100) powers the outdoor doorbell (310); and in response to the outdoor switch (320) being switched on, the bell controller (220) is turned off, and the power supply (100) powers the indoor bell (210).

6 Claims, 5 Drawing Sheets

(58) Field of Classification Search
USPC ........................................................ 340/384.1
See application file for complete search history.

(56) References Cited

U.S. PATENT DOCUMENTS

| | | | | |
|---|---|---|---|---|
| 10,560,149 | B1 * | 2/2020 | Skeoch | H04B 3/54 |
| 10,638,097 | B1 * | 4/2020 | Skeoch | G08B 3/10 |
| 10,938,294 | B1 * | 3/2021 | Chin | H04N 23/651 |
| 2012/0239951 | A1 * | 9/2012 | Zhou | G06F 1/266 713/320 |
| 2016/0360105 | A1 * | 12/2016 | Huang | H04N 7/186 |
| 2017/0086281 | A1 * | 3/2017 | Avrahamy | H05B 47/115 |
| 2017/0294110 | A1 * | 10/2017 | Atchley | G08B 25/12 |
| 2017/0346406 | A1 * | 11/2017 | Bucheru | H02M 3/33523 |
| 2018/0083444 | A1 * | 3/2018 | Mehta | H02J 7/0063 |
| 2018/0190083 | A1 * | 7/2018 | Wu | G08B 3/10 |
| 2018/0195333 | A1 * | 7/2018 | Jeon | G08B 3/10 |
| 2018/0197383 | A1 * | 7/2018 | Tso | H03K 17/6871 |
| 2018/0308323 | A1 * | 10/2018 | Lee | H01M 10/44 |
| 2020/0388118 | A1 * | 12/2020 | Rosenberg | H02M 1/44 |
| 2022/0006904 | A1 * | 1/2022 | Nadal | H04N 7/186 |

FOREIGN PATENT DOCUMENTS

| | | | |
|---|---|---|---|
| CN | 108183608 | A | 6/2018 |
| CN | 108270222 | A | 7/2018 |
| CN | 207677492 | U | 7/2018 |
| CN | 210927209 | U | 7/2020 |
| CN | 111968321 | A | 11/2020 |

* cited by examiner

DOORBELL SYSTEM

This application is the national phase of International Application No. PCT/CN2021/080909, titled "DOORBELL SYSTEM", filed on Mar. 16, 2021, which claims priority to Chinese Patent Application No. 202011124527.7 titled "DOORBELL SYSTEM", filed on Oct. 20, 2020 with the China National Intellectual Property Administration (CNIPA), both of which are incorporated herein by reference in their entireties.

FIELD

The present disclosure relates to the field of circuit design for a doorbell, and in particular to a doorbell system.

BACKGROUND

As the technology develops, functional and intelligent products are increasingly used in daily life. A doorbell system is one of such products.

The doorbell system generally includes a power supply, an outdoor switch and an indoor electric bell. A structural diagram of such doorbell system is shown in FIG. 1. When a visitor presses the outdoor switch, a circuit of the doorbell system is powered on, and the indoor electric bell rings indicating a visit.

Currently, outdoor intelligent doorbell solutions are popular. An outdoor intelligent doorbell is generally provided with an outdoor intelligent doorbell terminal in addition to the conventional doorbell system. The conventional doorbell system cannot power the indoor electric bell and the outdoor intelligent doorbell simultaneously, and therefore the indoor electric bell and the outdoor intelligent doorbell cannot operate simultaneously. Otherwise, wiring buried in a wall is required to be transformed to allow the indoor electric bell and outdoor intelligent doorbell to operate simultaneously, which is complicated in practice and has a high cost.

Therefore, an urgent problem to be solved by those skilled in the art is how to provide a low-cost doorbell system in which an outdoor terminal and an indoor terminal are selectively powered and operate as needed.

SUMMARY

An objective of the present disclosure is to provide a doorbell system, in order to solve the problem that the outdoor terminal and the indoor terminal in a conventional doorbell system cannot be powered selectively and has a high transformation cost.

In order to solve the above technical problem, a doorbell system is provided according to embodiments of the present disclosure. The doorbell system includes an indoor terminal, an outdoor terminal and a power supply. The indoor terminal includes a bell controller and an indoor bell which are connected in parallel. The outdoor terminal includes an outdoor doorbell and an outdoor switch. The indoor terminal, the outdoor terminal and the power supply are connected in series to form a closed loop circuit. In response to the outdoor switch being switched off, the bell controller is turned on, the indoor bell is short-circuited, and the power supply powers the outdoor doorbell. In response to the outdoor switch being switched on, the bell controller is turned off, and the power supply powers the indoor bell.

In an embodiment, in the doorbell system, the outdoor switch is a mechanical switch, and the mechanical switch is connected in parallel with the outdoor doorbell.

In an embodiment, in the doorbell system, the bell controller includes a power module and a sensing switch module. The power module is configured to: rectify an alternating-current (AC) voltage supplied by the power supply into a direct-current (DC) voltage, and supply the DC voltage to the sensing switch module. The sensing switch module is configured to turn on and turn off the bell controller.

In an embodiment, in the doorbell system, the power module includes a third resistor, a transient diode, a first capacitor, and a rectifier bridge stack. A first connection terminal of the bell controller is connected to a first terminal of the indoor bell. A second connection terminal of the bell controller is connected to a second terminal of the indoor bell. The first connection terminal is connected to a first terminal of the third resistor. A second terminal of the third resistor is connected to a second terminal of the transient diode and a first AC input terminal of the rectifier bridge stack. The second connection terminal is connected to a first terminal of the transient diode and a second AC input terminal of the rectifier bridge stack. A positive DC output terminal of the rectifier bridge stack serves as a positive DC electrode, and a negative DC output terminal of the rectifier bridge stack serves as a negative DC electrode. The positive DC electrode is connected to a first terminal of the first capacitor, and the negative DC electrode is connected to a second terminal of the first capacitor.

In an embodiment, in the doorbell system, the sensing switch module includes a normally-closed relay, a first resistor, a second resistor, an N-channel MOS transistor, and a voltage control circuit. The positive DC electrode is connected to a first terminal of the second resistor. A second terminal of the second resistor is connected to a positive control terminal of the normally-closed relay and a drain of the N-channel MOS transistor. A negative control terminal of the normally-closed relay is connected to the negative DC electrode. A first contact terminal of the normally-closed relay is connected to a first terminal of the first resistor. A second terminal of the first resistor is connected to the first terminal of the third resistor and the first connection terminal. A second contact terminal of the normally-closed relay is connected to the first terminal of the transient diode, the second AC input terminal of the rectifier bridge stack, and the second connection terminal. A source of the N-channel MOS transistor is connected to the negative DC electrode. A gate of the N-channel MOS transistor is connected to the voltage control circuit. The voltage control circuit is connected to the gate of the N-channel MOS transistor, and is configured to switch on and switch off the N-channel MOS transistor based on whether the outdoor switch is switched on or off.

In an embodiment, in the doorbell system, the bell controller further includes a fuse. A first terminal of the fuse is connected to the first connection terminal, and a second terminal of the fuse is connected to the second terminal of the first resistor and the first terminal of the third resistor.

In an embodiment, in the doorbell system, the voltage control circuit includes a first operational amplifier, a ninth resistor, a fourth resistor, a seventh resistor, an eleventh resistor, a thirteenth resistor, a second capacitor and a fourth capacitor. The positive DC electrode is connected to a first terminal of the ninth resistor and a positive power supply terminal of the first operational amplifier. A second terminal of the ninth resistor is connected to the gate of the N-channel MOS transistor and an output terminal of the first operational amplifier. A non-inverting input terminal of the first operational amplifier is connected to a first terminal of the second capacitor, a second terminal of the fourth resistor and a first terminal of the seventh resistor. A first terminal of the fourth resistor is connected to the positive DC electrode. A second terminal of the seventh resistor is connected to a second terminal of the second capacitor and the negative DC electrode. An inverting input terminal of the first operational amplifier is connected to a first terminal of the fourth capacitor, a second terminal of the eleventh resistor and a first terminal of the thirteenth resistor. A first terminal of the eleventh resistor is connected to the positive DC electrode. A second terminal of the thirteenth resistor is connected to a second terminal of the fourth capacitor and the negative DC electrode. A negative power supply terminal of the first operational amplifier is connected to the negative DC electrode. A voltage across the fourth capacitor is greater than a voltage across the second capacitor, and capacitance of the fourth capacitor is less than capacitance of the second capacitor.

In an embodiment, in the doorbell system, the sensing switch module further includes a timing control circuit. The timing control circuit is connected to the gate of the N-channel MOS transistor, and is configured to switch on the N-channel MOS transistor when a first preset period lapsing after the outdoor switch is switched on.

In an embodiment, in the doorbell system, the timing control circuit includes a second operational amplifier, a tenth resistor, a fifth resistor, an eighth resistor, a twelfth resistor, a fourteenth resistor, a third capacitor and a fifth capacitor. The positive DC electrode is connected to a first terminal of the tenth resistor and a positive power supply terminal of the second operational amplifier. A second terminal of the tenth resistor is connected to the gate of the N-channel MOS transistor and an output terminal of the second operational amplifier. A non-inverting input terminal of the second operational amplifier is connected to a first terminal of the third capacitor, a second terminal of the fifth resistor, and a first terminal of the eighth resistor. A first terminal of the fifth resistor is connected to the positive DC electrode. A second terminal of the eighth resistor is connected to a second terminal of the third capacitor and the negative DC electrode. An inverting input terminal of the second operational amplifier is connected to a first terminal of the fifth capacitor, a second terminal of the twelfth resistor, and a first terminal of the fourteenth resistor. A first terminal of the twelfth resistor is connected to the positive DC electrode. A second terminal of the fourteenth resistor is connected to a second terminal of the fifth capacitor and the negative DC electrode. A negative power supply terminal of the second operational amplifier is connected to the negative DC electrode. A voltage across the fifth capacitor is less than a voltage across the third capacitor, and capacitance of the fifth capacitor is less than capacitance of the third capacitor.

In an embodiment, in the doorbell system, the timing control circuit further includes a diode and a sixth resistor. A cathode of the diode is connected to the positive DC electrode and the first terminal of the fifth resistor. An anode of the diode is connected to a first terminal of the sixth resistor. A second terminal of the sixth resistor is connected to the second terminal of the fifth resistor, the first terminal of the eighth resistor, the first terminal of the third capacitor and the non-inverting input terminal of the second operational amplifier.

The doorbell system according to embodiments of the present disclosure includes an indoor terminal, an outdoor terminal, and a power supply. The indoor terminal includes a bell controller and an indoor bell that are connected in parallel. The outdoor terminal includes an outdoor doorbell and an outdoor switch. The indoor terminal, the outdoor terminal and the power supply are connected in series to form a closed loop circuit. In response to the outdoor switch being switched off, the bell controller is turned on, the indoor bell is short-circuited, and the power supply powers the outdoor doorbell. In response to the outdoor switch being switched on, the bell controller is turned off, and the power supply powers the indoor bell. In the present disclosure, the bell controller is connected in parallel with the indoor bell, and thus it depends on an operation of the outdoor switch to determine whether the bell controller is to be turned on or off, and whether the indoor bell receives a sufficient operation voltage or the outdoor doorbell receives a sufficient operation voltage. Hence, the outdoor doorbell can be directly equipped outside a door without changing an original wiring in a building wall, and the outdoor doorbell is compatible with the existing indoor bell, so that an installation process is greatly simplified.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

Hereinafter technical solutions in embodiments of the present disclosure are described in further detail in conjunction with the drawings and embodiments of the present closure, in order to help those skilled in the art understand the solutions better. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 1:
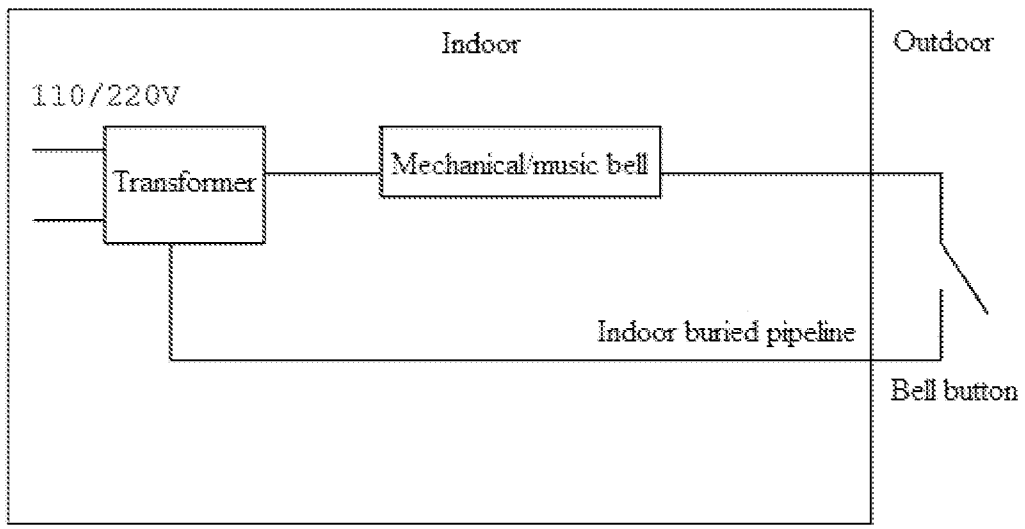
FIG. 1 is a schematic structural diagram showing a circuit of a doorbell according to a conventional technology.
Figure 2:
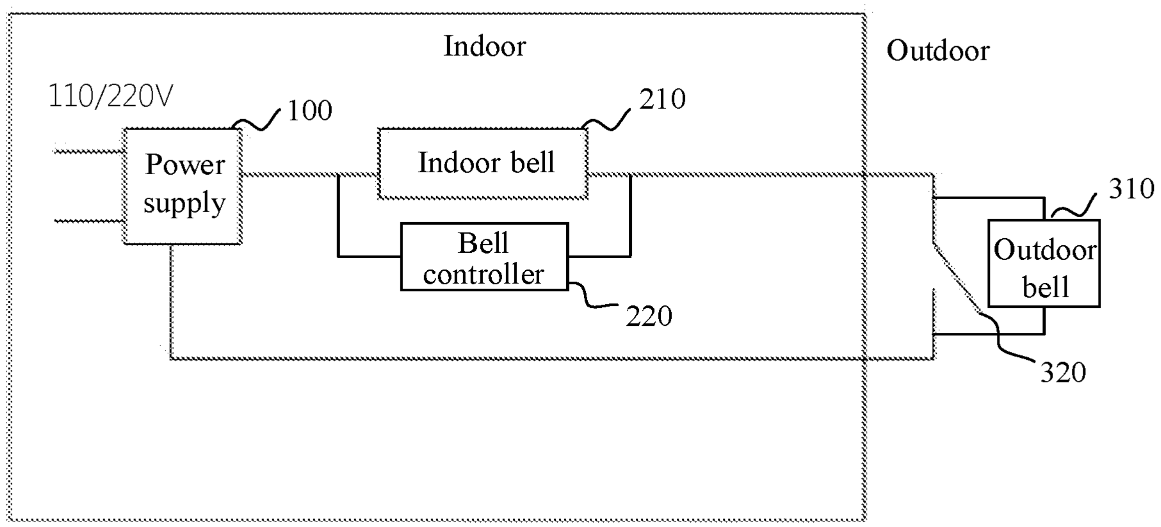
FIG. 2 is a schematic structural diagram showing a doorbell system according to an embodiment of the present disclosure.

A core of the present disclosure is to provide a doorbell system. FIG. 2 is a schematic structural diagram showing a doorbell system according to a first embodiment. As shown in FIG. 2, the doorbell system includes an indoor terminal, an outdoor terminal, and a power supply 100.

The indoor terminal includes a bell controller 220 and an indoor bell 210. The bell controller 220 and the indoor bell 210 are connected in parallel. The outdoor terminal includes an outdoor doorbell 310 and an outdoor switch 320.

The indoor terminal, the outdoor terminal and the power supply 100 are connected in series to form a closed loop circuit.

In response to the outdoor switch 320 being switched off, the bell controller 220 is turned on, the indoor bell 210 is short-circuited, and the power supply 100 powers the outdoor doorbell 310. In response to the outdoor switch 320 being switched on, the bell controller 220 is turned off, and the power supply 100 powers the indoor bell 210.

In a preferred embodiment, the outdoor switch 320 is a mechanical switch.

The mechanical switch and the outdoor doorbell 310 are connected in parallel. The parallel connection between the mechanical switch and the outdoor doorbell 310 is easy to realize, and makes a small change to the original circuit. Apparently, the mechanical switch and the outdoor doorbell 310 may be connected in other circuit layouts. In addition to the outdoor doorbell 310, the outdoor terminal may further include other electrical devices, such as a monitoring camera or an intercom, as needed or when necessary. Connections of the electrical devices and the mechanical switch may be determined based on an actual requirement. FIG. 2 shows an example in which the mechanical switch and the outdoor doorbell 310 are connected in parallel. In the structure shown in FIG. 2, the outdoor doorbell 310 and the indoor bell 210 are connected in series and divide a voltage, and thus neither of the outdoor doorbell 310 and the indoor bell 210 can obtain an enough voltage and be activated. After the bell controller 220 is connected in parallel with the indoor bell 210, since an internal impedance of the bell controller 220 is small, the indoor bell 210 is short-circuited, and the outdoor doorbell 310 obtains a sufficient voltage and is activated. When the outdoor switch 320 is switched on, the outdoor doorbell 310 is short-circuited, and a signal (for example, an increase of a voltage across the bell controller 220) is detected by the bell controller 220. In response to the signal, an interior switch in the bell controller 220 is switched off to cut off a path through the bell controller 220, and therefore a current has to flow through the indoor bell 210 and the indoor bell 210 rings.

The outdoor doorbell 310 is generally an intelligent doorbell, and functions as a video chat device. A visitor (outdoor person) may communicate with an indoor person through a display screen, a microphone and a camera installed on the outdoor doorbell 310. The indoor bell 210 is generally a mechanical bell which rings when energized. When the outdoor person communicates with the indoor people through the outdoor doorbell 310, the indoor bell 210 is generally not required to ring. When the outdoor person presses the mechanical switch to ring the indoor bell 210, a situation of communicating through the outdoor doorbell 310 is not triggered. Hence, the outdoor doorbell 310 and the indoor bell 210 are not to ring simultaneously. In embodiments of the present disclosure, a circuit is re-designed without making great changes, by using the outdoor switch 320 to switch working statues of the outdoor doorbell 310 and the indoor bell 210, so that an installation process is simplified without affecting normal operations of the outdoor doorbell 310 and the indoor bell 210.

In another example, the outdoor switch 320 may be an electronic switch integrated into the outdoor doorbell 310.

The bell controller 220 may be further configured to communicate with a host in a wireless or wired manner, and operate in response to control of the host.

The doorbell system according to the embodiment of the present disclosure includes an indoor terminal, an outdoor terminal and a power supply 100. The indoor terminal includes a bell controller 220 and an indoor bell 210, which are connected in parallel. The outdoor terminal includes an outdoor doorbell 310 and an outdoor switch 320. The indoor terminal, the outdoor terminal and the power supply 100 are connected in series to form a closed loop circuit. In response to the outdoor switch 320 being switched off, the bell controller 220 is turned on, the indoor bell 210 is short-circuited, and the power supply 100 powers the outdoor doorbell 310. In response to the outdoor switch 320 being switched on, the bell controller 220 is turned off, and the power supply 100 powers the indoor bell 210. In the embodiment of the present disclosure, the bell controller 220 is connected in parallel with the indoor bell 210, and thus it depends on an operation of the outdoor switch 320 to determine whether the bell controller 220 is to be turned on or off, and whether the indoor bell 210 receives a sufficient operation voltage or the outdoor doorbell 310 receives a sufficient operation voltage. Hence, the outdoor doorbell 310 can be directly equipped outside a door without changing an original wiring in a building wall, and the outdoor doorbell 310 is compatible with the existing indoor bell 210, so that an installation process is greatly simplified.

Figure 3:
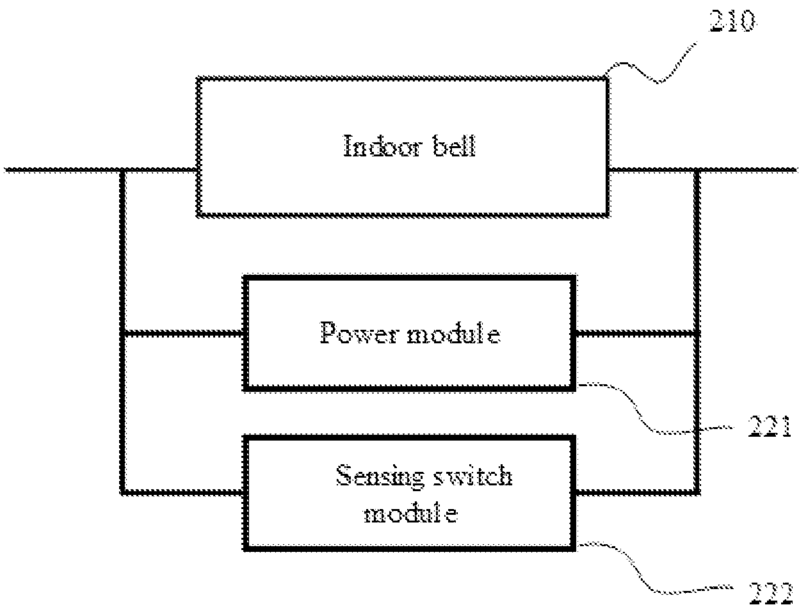
FIG. 3 is a schematic diagram showing a local structure of a doorbell system according to another embodiment of the present disclosure.

Based on the above-described embodiment, the bell controller 220 is further improved according to a second embodiment. FIG. 3 is a schematic diagram showing a local structure of a doorbell system according to the second embodiment. The doorbell system includes an indoor terminal, an outdoor terminal and a power supply 100.

The indoor terminal includes a bell controller 220 and an indoor bell 210. The bell controller 220 and the indoor bell 210 are connected in parallel. The outdoor terminal includes an outdoor doorbell 310 and an outdoor switch 320.

The indoor terminal, the outdoor terminal and the power supply 100 are connected in series to form a closed loop circuit.

In response to the outdoor switch 320 being switched off, the bell controller 220 is turned on, the indoor bell 210 is short-circuited, and the power supply 100 powers the outdoor doorbell 310.

In response to the outdoor switch 320 being switched on, the bell controller 220 is turned off, and the power supply 100 powers the indoor bell 210.

The bell controller 220 includes a power module 221 and a sensing switch module 222.

The power module 221 is configured to rectify an AC voltage supplied by the power supply 100 into a DC voltage, and supply the DC voltage to the sensing switch module 222.

The sensing switch module 222 is configured to turn on and turn off the bell controller 220.

In the doorbell system according to the embodiment, a specific structure of the bell controller 220 is provided, which is different from that in the doorbell system according to the previous embodiment, and structures of other components are the same as those described in the previous embodiment, and are not repeated here.

Figure 4:
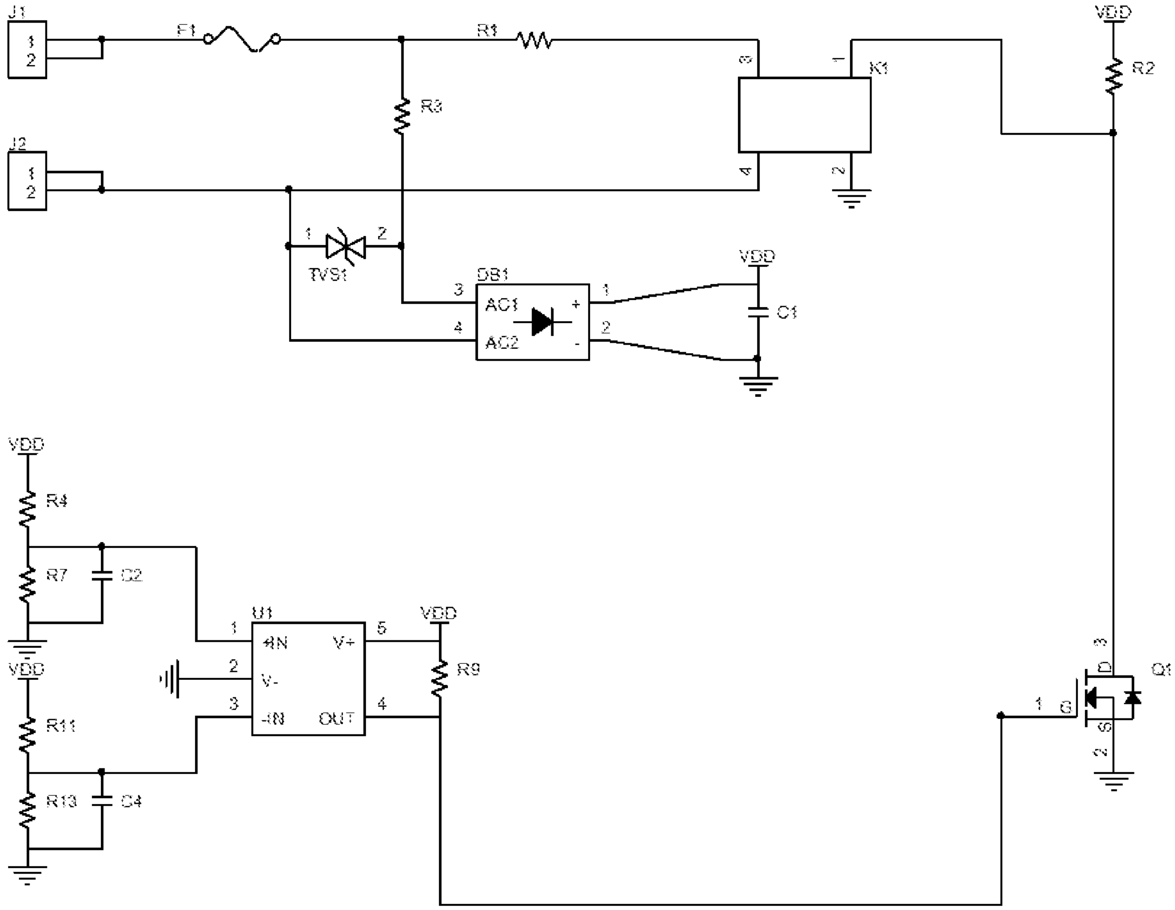
FIG. 4 is a schematic diagram showing a local circuit of a doorbell system according to another embodiment of the present disclosure.

The bell controller 220 according to the embodiment has a simple structure and is easy to be implemented. A structure and connection of the power module 221 and the sensing switch module 222 are shown in FIG. 4. In an implementation, the power module 221 includes a third resistor R3, a transient diode TVS1, a first capacitor C1, and a rectifier bridge stack DB1.

A first connection terminal J1 of the bell controller 220 is connected to a first terminal of the indoor bell 210, and a second connection terminal J2 of the bell controller 220 is connected to a second terminal of the indoor bell 210.

The first connection terminal J1 is connected to a first terminal of the third resistor R3. A second terminal of the third resistor R3 is connected to a second terminal of the transient diode TVS1 and a first AC input terminal of the rectifier bridge stack DB1.

The second connection terminal J2 is connected to a first terminal of the transient diode TVS1 and a second AC input terminal of the rectifier bridge stack DB1.

A positive DC output terminal of the rectifier bridge stack DB1 serves as a positive DC electrode, and a negative DC output terminal of the rectifier bridge stack DB1 serves as a negative DC electrode. The positive DC electrode is connected to a first terminal of the first capacitor, and the negative DC electrode is connected to a second terminal of the first capacitor C1.

The sensing switch module 222 includes a normally-closed relay K1, a first resistor R1, a second resistor R2, an N-channel MOS transistor Q1 and a voltage control circuit.

The positive DC electrode is connected to a first terminal of the second resistor R2. A second terminal of the second resistor R2 is connected to a positive control terminal of the normally-closed relay K1 and a drain of the N-channel MOS transistor Q1.

A negative control terminal of the normally-closed relay K1 is connected to the negative DC electrode. A first contact terminal of the normally-closed relay K1 is connected to a first terminal of the first resistor R1. A second terminal of the first resistor R1 is connected to the first terminal of the third resistor R3 and the first connection terminal J1. A second contact terminal of the normally-closed relay K1 is connected to the first terminal of the transient diode TVS1, the second AC input terminal of the rectifier bridge stack DB1, and the second connection terminal J2.

A source of the N-channel MOS transistor Q1 is connected to the negative DC electrode, and a gate of the N-channel MOS transistor Q1 is connected to the voltage control circuit.

The voltage control circuit is connected to the gate of the N-channel MOS transistor Q1, in order to control an on/off state of the N-channel MOS transistor Q1 according to an on/off state of the outdoor switch 320.

Based on the above sensing switch module 222, the voltage control circuit includes a first operational amplifier U1, a ninth resistor R9, a fourth resistor R4, a seventh resistor R7, an eleventh resistor R11, a thirteenth resistor R13, a second capacitor C2 and a fourth capacitor C4.

The positive DC electrode is connected to a first terminal of the ninth resistor R9 and a positive power terminal of the first operational amplifier U1. A second terminal of the ninth resistor R9 is connected to the gate of the N-channel MOS transistor Q1 and an output terminal of the first operational amplifier U1.

A non-inverting input terminal of the first operational amplifier U1 is connected to a first terminal of the second capacitor C2, a second terminal of the fourth resistor R4, and a first terminal of the seventh resistor R7. A first terminal of the fourth resistor R4 is connected to the positive DC electrode. A second terminal of the seventh resistor R7 is connected to a second terminal of the second capacitor C2 and the negative DC electrode.

An inverting input terminal of the first operational amplifier U1 is connected to a first terminal of the fourth capacitor C4, a second terminal of the eleventh resistor R11, and a first terminal of the thirteenth resistor R13. A first terminal of the eleventh resistor R11 is connected to the positive DC electrode. A second terminal of the thirteenth resistor R13 is connected to a second terminal of the fourth capacitor C4 and the negative DC electrode.

A negative power supply terminal of the first operational amplifier U1 is connected to the negative DC electrode.

A voltage across the fourth capacitor C4 is greater than a voltage across the second capacitor C2, and a capacitance of the fourth capacitor C4 is less than a capacitance of the second capacitor C2.

Based on the power module 221, the sensing switch module 222 and the voltage control circuit, described in embodiments further include a method for implementing functions of the power module 221, the sensing switch module 222 and the voltage control circuit by using a circuit. Apparently, the functions may be implemented through a chip or a processor.

In a further embodiment, the bell controller 220 includes a fuse F1.

A first terminal of the fuse F1 is connected to the first connection terminal J1, and a second terminal of the fuse F1 is connected to the second terminal of the first resistor R1 and the first terminal of the third resistor R3.

The first connection terminal J1 and the second connection terminal J2 of the bell controller 220 are connected to a first terminal and a second terminal of the indoor bell 210, respectively. An AC current from a power transformer flows in via the first terminal of the indoor bell 210, through the first connection terminal J1, the fuse F1, the resistor R1, a pin 3 of the control switch K1 and a pin 4 of the control switch K1 (the control switch K1 is normally-closed) and the connection terminal J2, to the second terminal of the indoor bell 210. Hence, the AC current is supplied to the outdoor doorbell 310 through wires buried in a wall.

When the outdoor switch 320 is pressed and thereby switched on, the AC current is applied to the indoor bell 210 via the electronic switch, the bell controller 220 connected in parallel with the indoor bell 210 detects that a voltage between the two terminals of the indoor bell 210 increases, the AC current flows through the resistor R3, the transient diode TVS1, and enters the rectifier bridge stack DB1 to be rectified, and is then filtered through the capacitor C1, so that a stable DC voltage is obtained.

The stable DC voltage is applied to the electronic switch (that is, the normally-closed relay K1) via the resistor R2, and the electronic switch is immediately switched off. In such case, the bell controller 220 is switched off, and the power supply, the indoor bell 210 and the outdoor switch 320 form a closed loop circuit, and the indoor bell 210 is energized and rings.

A process of switching off the electronic switch is as follows. The DC voltage charges the second capacitor C2 through the fourth resistor R4 and the seventh resistor R7, and charges the fourth capacitor C4 through the eleventh resistor R11 and the thirteenth resistor R13. Since the capacitance of the fourth capacitor C4 is less than the capacitance of the second capacitor C2, and thus a time period required for the fourth capacitor C4 to be fully charged is less than a time period required for the second capacitor C2 to be fully charged. Since an overall resistance of the eleventh resistor R11 and the thirteenth resistor R13 is less than an overall resistance of the fourth resistor R4 and the seventh resistor R7, the voltage across the fourth capacitor C4 is greater than the voltage across the second capacitor C2. Therefore, the voltage across the fourth capacitor C4 increases faster than and remains greater than the voltage across the second capacitor C2. Hence, a voltage on a pin 3 of the first operational amplifier U1 is greater than a voltage on a pin 1 of the first operational amplifier U1, and a pin 4 of the first operational amplifier U1 outputs a low level. In such case, the N-channel MOS transistor Q1 is switched off, and the electronic switch K1 is switched off.

In response to the outdoor switch 320 being switched off after a period of time, the voltage between the two terminals of the indoor bell decreases, and the voltage across the first capacitor C1 decreases slowly through the third resistor R3, the transient diode TVS1, and the rectifier bridge stack DB1. Therefore, the DC voltage is insufficient for the second capacitor C2 and the fourth capacitor C4, and the second capacitor C2 and the fourth capacitor C4 start to discharge. Since the fourth capacitor C4 is different from the second capacitor C2 in parameters, the voltage across the fourth capacitor C4 drops faster than the voltage across the second capacitor C2. Therefore, the voltage across the second capacitor C2 is greater than the voltage across the fourth capacitor C4 at a certain time instant during discharging, that is, the voltage on the pin 3 of the first operational amplifier U1 is less than the voltage on the pin 1 of the first operational amplifier U1, and the pin 4 of the first operational amplifier U1 outputs a high level through the ninth resistor R9, so that a switched-on condition for the N-channel MOS transistor Q1 is met. In such case, the N-channel MOS transistor Q1 is switched on, and a residual voltage across the first capacitor C1 is rapidly discharged through the second resistor R2 and the N-channel MOS transistor Q1, resulting in the voltage across the electronic switch K1 being insufficient to maintain the off-state of the electronic switch. Therefore, the electronic switch K1 is switched on, the bell controller is switched on, and the indoor bell 210 is short-circuited.

Figure 5:
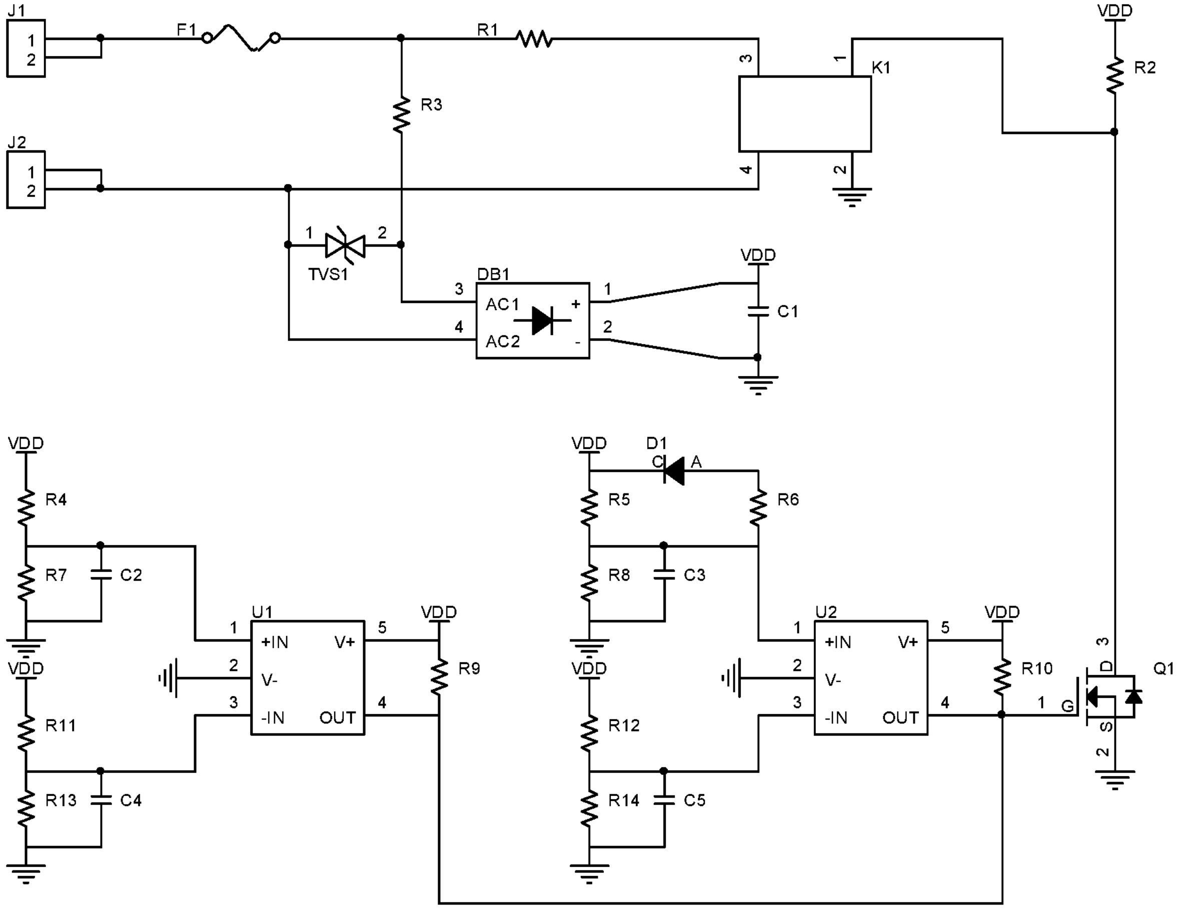
FIG. 5 is a schematic diagram showing a local circuit of a doorbell system according to yet another embodiment of the present disclosure.

Based on the foregoing embodiment, the bell controller 220 is further improved according to yet another embodiment. FIG. 5 is a schematic diagram showing a local structure of a doorbell system according to the embodiment. The doorbell system includes an indoor terminal, an outdoor terminal, and a power supply 100.

The indoor terminal includes a bell controller 220 and an indoor bell 210 that are connected in parallel. The outdoor terminal includes an outdoor doorbell 310 and an outdoor switch 320.

The indoor terminal, the outdoor terminal and the power supply 100 are connected in series to form a closed loop circuit.

In response to the outdoor switch 320 being switched off, the bell controller 220 is turned on, the indoor bell 210 is short-circuited, and the power supply 100 powers the outdoor doorbell 310.

In response to the outdoor switch 320 being switched on, the bell controller 220 is turned off, and the power supply 100 powers the indoor bell 210.

The bell controller 220 includes a power module 221 and a sensing switch module 222.

The power module 221 is configured to rectify an AC voltage supplied by the power supply 100 into a DC voltage, and supply the DC voltage to the sensing switch module 222.

The sensing switch module 222 is configured to turn on and turn off the bell controller 220.

The sensing switch module 222 further includes a timing control circuit.

The timing control circuit is connected to the gate of the N-channel MOS transistor Q1, and is configured to switch on the N-channel MOS transistor Q1 when a first preset period lapsing after the outdoor switch 320 is switched on.

In the doorbell system according to the embodiment, the timing control circuit is additionally provided in the sensing switch module 222, which is different from that in the doorbell system according to the previous embodiment, and structures of other components are the same as those described in the previous embodiment, and are not repeated here.

In the embodiment, the timing control circuit is configured to control the N-channel MOS transistor Q1 to be switched on in a case that the voltage control circuit loses a detection signal or fails to normally operate, so that operation stability and reliability of the doorbell system is greatly improved. In an embodiment, as shown in FIG. 5, the timing control circuit includes a second operational amplifier U2, a tenth resistor R10, a fifth resistor R5, an eighth resistor R8, a twelfth resistor R12, a fourteenth resistor R14, a third capacitor C3 and a fifth capacitor C5.

The positive DC electrode is connected to a first terminal of the tenth resistor R10 and a positive power supply terminal of the second operational amplifier U2. A second terminal of the tenth resistor R10 is connected to the gate of the N-channel MOS transistor Q1 and an output terminal of the second operational amplifier U2.

A non-inverting input terminal of the second operational amplifier U2 is connected to a first terminal of the third capacitor C3, a second terminal of the fifth resistor R5, and a first terminal of the eighth resistor R8.

A first terminal of the fifth resistor R5 is connected to the positive DC electrode. A second terminal of the eighth resistor R8 is connected to a second terminal of the third capacitor C3 and the negative DC electrode.

An inverting input terminal of the second operational amplifier U2 is connected to a first terminal of the fifth capacitor C5, a second terminal of the twelfth resistor R12, and a first terminal of the fourteenth resistor R14. A first terminal of the twelfth resistor R12 is connected to the positive DC electrode. A second terminal of the fourteenth resistor R14 is connected to a second terminal of the fifth capacitor C5 and the negative DC electrode.

A negative power supply terminal of the second operational amplifier U2 is connected to the negative DC electrode.

A voltage across the fifth capacitor C5 is less than a voltage across the third capacitor C3, and a capacitance of the fifth capacitor C5 is less than a capacitance of the third capacitor C3.

The timing control circuit starts to operate when receiving a DC voltage. The DC voltage charges the third capacitor C3 through the fifth resistor R5 and the eighth resistor R8, and charges the fifth capacitor C5 through the twelfth resistor R12 and the fourteenth resistor R14. Since the capacitance of the third capacitor C3 is greater than the capacitance of the fifth capacitor C5, a time period required for the fifth capacitor C5 to be fully charged is less than a time period required for the third capacitor C3 to be fully charged. It is assumed that the timing control circuit is designed to control the voltage across the third capacitor C3 to be greater than the voltage across the fifth capacitor C5 after 2 to 3 seconds since the timing control circuit starts to operate. In a case that the voltage across the third capacitor C3 is greater than the voltage across the fifth capacitor C5, a voltage on a pin 1 of the second operational amplifier U2 is greater than a voltage on a pin 3 of the second operational amplifier U2, and a pin 4 of the second operational amplifier U2 outputs a high level through the tenth resistor R10, so that a switched-on condition for the N-channel MOS transistor Q1 is met. In such case, the N-channel MOS transistor Q1 is switched on, and a residual voltage across the first capacitor C1 is rapidly discharged through the second resistor R2 and the N-channel MOS transistor Q1, resulting in the voltage across the electronic switch K1 being insufficient to maintain the off-state of the electronic switch. Therefore, the electronic switch K1 is switched on, the bell controller 220 is switched on, and the indoor bell 210 is short-circuited.

In a further embodiment, the timing control circuit further includes a diode D1 and a sixth resistor R6.

A cathode of the diode D1 is connected to the positive DC electrode and the first terminal of the fifth resistor R5. An anode of the diode D1 is connected to a first terminal of the sixth resistor R6.

A second terminal of the sixth resistor R6 is connected to the second terminal of the fifth resistor R5, the first terminal of the eighth resistor R8, the first terminal of the third capacitor C3, and the non-inverting input terminal of the second operational amplifier.

During charging of the third capacitor C3 and the fifth capacitor C5, the diode D1 is connected in a reverse bias, which may be considered as the diode D1 being switched off. During discharging of the third capacitor C3, the diode D1 is connected in a forward bias, which may be considered as an additional discharging path, so that a discharge efficiency of the third capacitor C3 is improved, avoiding influence on a time period during which the second operational amplifier U2 outputs a high level due to a stand-by circuit enters an operation state when the third capacitor C3 is not fully discharged because of a low discharge efficiency. Furthermore, resistance of the sixth resistor R6 may be much less than resistance of the fifth resistor R5, so as to improve the discharge efficiency.

The embodiments are described in this specification in a progressive way. Various embodiments may refer to each other for the same or similar parts, and each embodiment places emphasis on the difference from other embodiments. The device disclosed in the embodiments corresponds to the method embodiments, and therefore is described simply, and for relevant matters references may be made to the description of the method.

It should be noted that the relationship terminologies such as first, second or the like are used herein to distinguish one entity or operation from another, rather than to necessitate or imply an actual relationship or order among the entities or operations. Furthermore, terms “include”, “comprise” or any other variants are intended to cover the non-exclusive inclusion. Therefore, a process, method, article or device including a series of elements is not necessarily limited to those expressly listed steps or units, but may include other elements not expressly listed or inherent to the process, method, article, or device. Unless expressively limited otherwise, a statement “comprising (including) one . . . ” does not exclude existence of another similar element in the process, method, article or device.

Hereinabove described is the doorbell system according to embodiments of the present disclosure. Specific examples are provided to explain principles and embodiments of the present disclosure, and the above description of the embodiments is only used to facilitate understanding of the method and core concept of the present disclosure. It should be noted that those skilled in the art can make various improvements and modifications to the present disclosure without departing from the principle of the present disclosure, and these improvements and modifications shall fall within the protection scope of the present disclosure.

The invention claimed is:

1. A doorbell system, comprising an indoor terminal, an outdoor terminal, and a power supply, wherein the indoor terminal comprises a bell controller and an indoor bell which are connected in parallel, the outdoor terminal comprises an outdoor doorbell and an outdoor switch;

the indoor terminal, the outdoor terminal and the power supply are connected in series to form a closed loop circuit;

in response to the outdoor switch being switched off, the bell controller is turned on, the indoor bell is short-circuited, and the power supply powers the outdoor doorbell;

in response to the outdoor switch being switched on, the bell controller is turned off, and the power supply powers the indoor bell;

the outdoor switch is a mechanical switch, and the mechanical switch is connected in parallel with the outdoor doorbell;

the bell controller comprises a power module and a sensing switch module, wherein the power module is configured to: rectify an alternating-current (AC) voltage supplied by the power supply into a direct-current (DC) voltage, and supply the direct-current (DC) voltage to the sensing switch module; and the sensing switch module is configured to turn on and turn off the bell controller;

the power module comprises a third resistor, a transient diode, a first capacitor, and a rectifier bridge stack, wherein a first connection terminal of the bell controller and a second connection terminal of the bell controller are connected to two terminals of the indoor bell, respectively;

the first connection terminal is connected to a first terminal of the third resistor;

a second terminal of the third resistor is connected to a second terminal of the transient diode and a first AC input terminal of the rectifier bridge stack;

the second connection terminal is connected to a first terminal of the transient diode and a second AC input terminal of the rectifier bridge stack;

a positive DC output terminal of the rectifier bridge stack serves as a positive DC electrode, and a negative DC output terminal of the rectifier bridge stack serves as a negative DC electrode; and the positive DC electrode and the negative DC electrode are connected to two terminals of the first capacitor, respectively; and the sensing switch module comprises a normally-closed relay, a first resistor, a second resistor, an N-channel MOS transistor, and a voltage control circuit, wherein the positive DC electrode is connected to a first terminal of the second resistor;

a second terminal of the second resistor is connected to a positive control terminal of the normally-closed relay and a drain of the N-channel MOS transistor;

a negative control terminal of the normally-closed relay is connected to the negative DC electrode;

a first contact terminal of the normally-closed relay is connected to a first terminal of the first resistor;

a second terminal of the first resistor is connected to the first terminal of the third resistor and the first connection terminal;

a second contact terminal the normally-closed relay is connected to the first terminal of the transient diode, the second AC input terminal of the rectifier bridge stack, and the second connection terminal;

a source of the N-channel MOS transistor is connected to the negative DC electrode; and a gate of the N-channel MOS transistor is connected to the voltage control circuit, wherein the voltage control circuit is configured to switch on and switch off the N-channel MOS transistor based on whether the outdoor switch is switched on or off.

2. The doorbell system according to claim 1, wherein the bell controller further comprises a fuse, wherein a first terminal of the fuse is connected to the first connection terminal, and a second terminal of the fuse is connected to the second terminal of the first resistor and the first terminal of the third resistor.

3. The doorbell system according to claim 1, wherein the voltage control circuit comprises a first operational amplifier, a ninth resistor, a fourth resistor, a seventh resistor, an eleventh resistor, a thirteenth resistor, a second capacitor, and a fourth capacitor, wherein the positive DC electrode is connected to a first terminal of the ninth resistor and a positive power supply terminal of the first operational amplifier;

a second terminal of the ninth resistor is connected to the gate of the N-channel MOS transistor and an output terminal of the first operational amplifier;

a non-inverting input terminal of the first operational amplifier is connected to a first terminal of the second capacitor, a second terminal of the fourth resistor, and a first terminal of the seventh resistor;

a first terminal of the fourth resistor is connected to the positive DC electrode;

a second terminal of the seventh resistor is connected to a second terminal of the second capacitor and the negative DC electrode;

an inverting input terminal of the first operational amplifier is connected to a first terminal of the fourth capacitor, a second terminal of the eleventh resistor, and a first terminal of the thirteenth resistor;

a first terminal of the eleventh resistor is connected to the positive DC electrode;

a second terminal of the thirteenth resistor is connected to a second terminal of the fourth capacitor and the negative DC electrode;

a negative power supply terminal of the first operational amplifier is connected to the negative DC electrode; and a voltage across the fourth capacitor is greater than a voltage across the second capacitor, and capacitance of the fourth capacitor is less than capacitance of the second capacitor.

4. The doorbell system according to claim 3, wherein the sensing switch module further comprises a timing control circuit, wherein the timing control circuit is connected to the gate of the N-channel MOS transistor, and is configured to switch on the N-channel MOS transistor when a first preset period lapsing after the outdoor switch is switched on.

5. The doorbell system according to claim 4, wherein the timing control circuit comprises a second operational amplifier, a tenth resistor, a fifth resistor, an eighth resistor, a twelfth resistor, a fourteenth resistor, a third capacitor and a fifth capacitor, wherein the positive DC electrode is connected to a first terminal of the tenth resistor and a positive power supply terminal of the second operational amplifier;

a second terminal of the tenth resistor is connected to the gate of the N-channel MOS transistor and an output terminal of the second operational amplifier;

a non-inverting input terminal of the second operational amplifier is connected to a first terminal of the third capacitor, a second terminal of the fifth resistor, and a first terminal of the eighth resistor;

a first terminal of the fifth resistor is connected to the positive DC electrode;

a second terminal of the eighth resistor is connected to a second terminal of the third capacitor and the negative DC electrode;

an inverting input terminal of the second operational amplifier is connected to a first terminal of the fifth capacitor, a second terminal of the twelfth resistor, and a first terminal of the fourteenth resistor;

a first terminal of the twelfth resistor is connected to the positive DC electrode;

a second terminal of the fourteenth resistor is connected to a second terminal of the fifth capacitor and the negative DC electrode;

a negative power supply terminal of the second operational amplifier is connected to the negative DC electrode; and a voltage across the fifth capacitor is less than a voltage across the third capacitor, and capacitance of the fifth capacitor is less than capacitance of the third capacitor.

6. The doorbell system according to claim 5, wherein the timing control circuit further comprises a diode and a sixth resistor, wherein a cathode of the diode is connected to the positive DC electrode and the first terminal of the fifth resistor;

an anode of the diode is connected to a first terminal of the sixth resistor; and a second terminal of the sixth resistor is connected to the second terminal of the fifth resistor, the first terminal of the eighth resistor, the first terminal of the third capacitor and the non-inverting input terminal of the second operational amplifier.

* * * * *